United States Patent
Sanchez et al.

(10) Patent No.: US 7,289,505 B2
(45) Date of Patent: Oct. 30, 2007

(54) EFFICIENT REVERSE PATH FORWARDING CHECK MECHANISM

(75) Inventors: Juan Diego Sanchez, San Jose, CA (US); Apurva Mehta, Cupertino, CA (US)

(73) Assignee: Lucent Technologies Inc., Murray Hill, NJ (US)

( * ) Notice: Subject to any disclaimer, the term of this patent is extended or adjusted under 35 U.S.C. 154(b) by 916 days.

(21) Appl. No.: 10/454,217

(22) Filed: Jun. 4, 2003

(65) Prior Publication Data

US 2003/0223402 A1 Dec. 4, 2003

Related U.S. Application Data

(60) Provisional application No. 60/386,079, filed on Jun. 4, 2002.

(51) Int. Cl.
*H04L 12/28* (2006.01)

(52) U.S. Cl. .................. 370/393; 370/401; 370/432
(58) Field of Classification Search ............. 370/393
See application file for complete search history.

(56) References Cited

U.S. PATENT DOCUMENTS

2003/0165140 A1* 9/2003 Tang et al. .............. 370/393

* cited by examiner

*Primary Examiner*—Seema S. Rao
*Assistant Examiner*—Wanda Z Russell

(57) ABSTRACT

An efficient Reverse Path Forwarding (RPF) check mechanism is disclosed. In one embodiment, when a network node receives a multicast packet on an incoming interface, the network node obtains an expected incoming interface identifier from either a unicast routing table or a multicast forwarding information table. A RPF Flag stored in association with multicast flow information determines from which table the interface identifier is obtained. If the expected incoming interface does not match the actual incoming interface, the multicast packet is discarded.

27 Claims, 4 Drawing Sheets

Fig. 1

| Source IP Addr. | Dest. IP Addr. | Unicast Outgoing Interface Identifier |
|---|---|---|
| X | 10.1.1.1 | A |
| X | 11.1.1.1 | B |
| X | 12.1.1.1 | C |
| X | 13.1.1.1 | D |
| X | 17.1.1.1 | E |
| X | 19.1.1.1 | F |
| . | . | . |
| . | . | . |

Fig. 2

| Multicast Flow (S,G) | RPF Flag | Expected Incoming Interface Identifier |
|---|---|---|
| (10.1.1.1, 230.1.1.1) | 0 | M |
| (11.1.1.1, 232.1.1.1) | 1 | N |
| (12.1.1.1, 233.1.1.1) | 1 | O |
| (13.1.1.1, 236.1.1.1) | 0 | P |
| (17.1.1.1, 237.1.1.1) | 1 | Q |
| (19.1.1.1, 238.1.1.1) | 0 | R |
| . | | . |
| . | | . |

EFFICIENT REVERSE PATH FORWARDING CHECK MECHANISM

CROSS-REFERENCE TO RELATED APPLICATION

This application is entitled to the benefit of provisional Patent Application Ser. No. 60/386,079, filed Jun. 4, 2002, which is hereby incorporated by reference for all purposes.

FIELD OF THE INVENTION

The present invention relates generally to the field of computer networking and more specifically to the routing of multicast packets within a computer network.

BACKGROUND OF THE INVENTION

Multicasting is a network information delivery method by which information from one or many sources is sent to multiple destinations. The transmitting host only generates a single stream of IP (Internet Protocol) packets. The network routers replicate the packets and deliver the packets to the proper receivers. The links leading to subnets consisting of entirely uninterested receivers do not carry any multicast traffic. Thus, multicast minimizes the burden placed on the sender, the network, and the receiver.

To avoid multicast routing loops, which can be disastrous because of the risk of repeatedly replicated packets, every multicast router must always verify that a multicast packet has arrived on an expected incoming interface before it forwards the packet to the appropriate outgoing interfaces. If the multicast packet did not arrive on the expected incoming interface, the packet will be discarded.

The process of verifying whether a multicast packet has arrived on the expected incoming interface is usually referred to as a Reverse Path Forwarding (RPF) check. Routers typically maintain the information necessary for RPF checks, such as the expected incoming interface for each multicast flow, in multicast forwarding information tables.

Several RPF check mechanisms have been proposed. However, those proposed mechanisms do not handle route changes well because they typically require updating many entries of a router's multicast forwarding information tables whenever a route change occurs. Updating many forwarding table entries within a router is resource intensive and time consuming. Delivery of multicast packets may be stalled or significantly delayed as a result.

Accordingly, there exists a need for a method and mechanism for efficiently performing RPF checks. What is also needed is a network node that can perform RPF checks quickly in response to a network topology change.

SUMMARY OF THE INVENTION

The invention provides an efficient method for performing a Reverse Path Forwarding (RPF) check in a network node. In one embodiment, when the network node receives a multicast packet via an incoming interface, the network node performs two table lookups. First, the network node performs a lookup on a first table (e.g., a multicast Forwarding Information Table) to retrieve an RPF flag and a first incoming interface identifier. The network node may also perform a lookup on a second table (e.g., a Unicast Routing Table) to retrieve another incoming interface identifier. Depending on the value of the RPF flag, the network node will select either the first incoming interface identifier or the second incoming interface identifier as the expected incoming interface for the multicast packet. The network node then compares the selected identifier to the identifier of the packet's actual incoming interface. If they match, the multicast packet is forwarded to an appropriate set of multicast outgoing interfaces. However, if the identifiers do not match, the multicast packet is dropped.

An advantage of the invention is that the network node can change the expected incoming interface quickly in response to a change in network topology by updating a single incoming interface identifier in the Unicast Routing Table, instead of updating incoming interface identifiers in multiple multicast forwarding information entries. Rapid convergence of new network topology can be accomplished with the RPF mechanism of the invention.

Other aspects and advantages of the invention will become apparent from the following detailed description, taken in conjunction with the accompanying drawings, illustrating by way of example the principles of the invention.

BRIEF DESCRIPTION OF THE DRAWINGS

FIG. 1 depicts an example Unicast Routing Table that can be used according to an embodiment of the invention to provide expected incoming interface information.

FIG. 2 depicts an example Multicast Forwarding Information Table (FIT) according to an embodiment of the invention for providing expected incoming interface information.

Throughout the description, similar reference numbers may be used to identify similar elements.

DETAILED DESCRIPTION OF THE INVENTION

Figure 3:
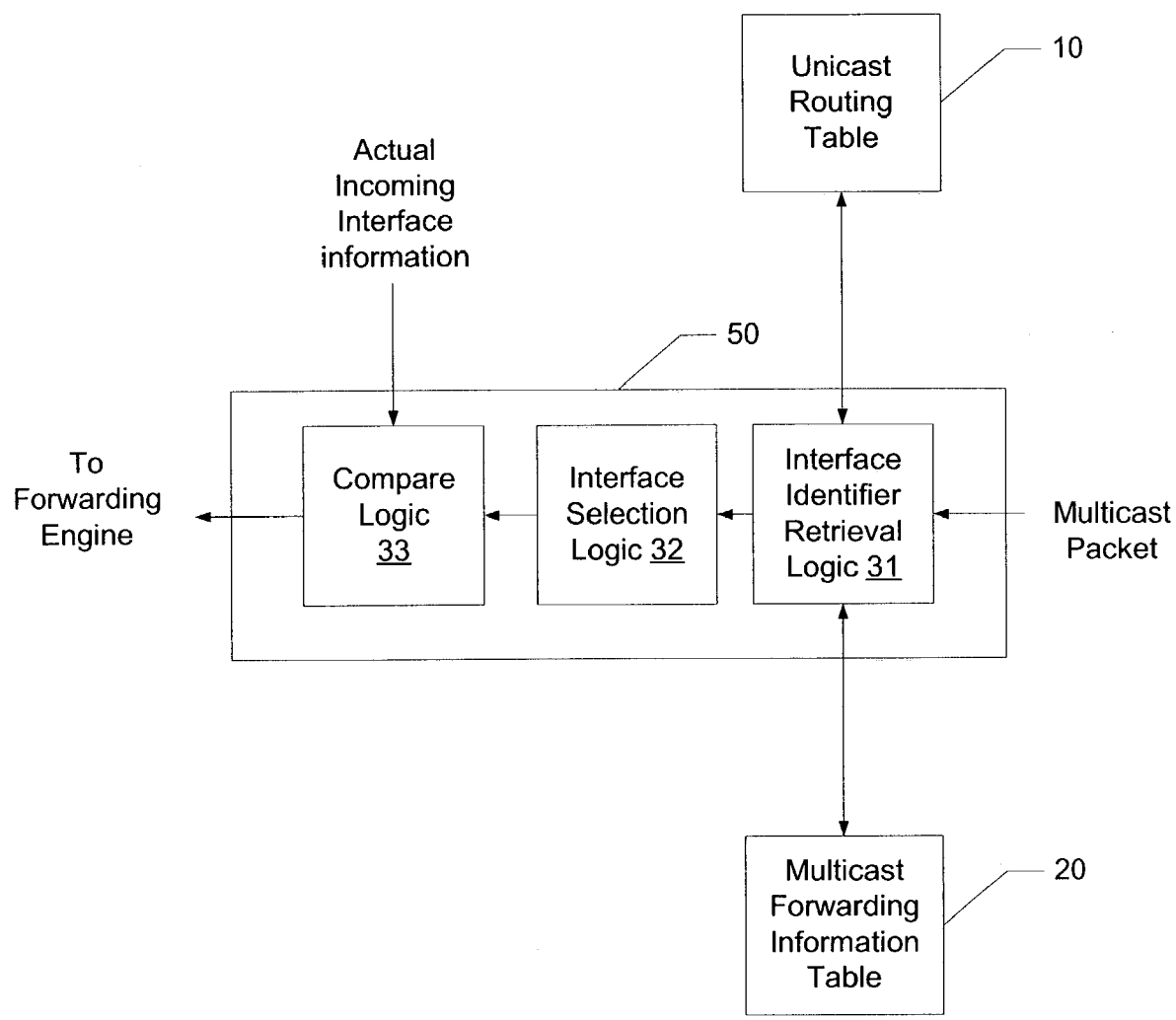
FIG. 3 depicts logic circuits for performing Reverse Path Forwarding checks on a multicast packet stream according to one embodiment of the invention.

To avoid potentially disastrous multicast routing loops, every multicast router must verify that a multicast packet has arrived on an expected incoming interface before it forwards the packet to the appropriate outgoing interfaces. If the multicast packet did not arrive on the expected incoming interface, the packet will be discarded. The process of verifying whether a multicast packet has arrived on the expected incoming interface is usually referred to as a Reverse Path Forwarding (RPF) check.

Naturally, the expected incoming interface can vary from one multicast flow to another. In addition, the expected incoming interface can vary according to network topology and other factors. For example, in Protocol Independent Multicast-Sparse Mode (PIM-SM), the expected incoming interface for a given multicast flow (S,G) depends on factors such as:

whether the router receiving the (S,G) packets is the Rendezvous Point Router (RP) associated with the multicast group G; and whether the router has already joined the Shortest Path Tree (SPT) for the (S,G) flow.

As used herein, a multicast (S,G) flow, or a (S,G) flow, refers to a sequence or stream of packets being sent from a source "S" to a multicast group "G." S refers to the unicast IP address of the source for the multicast traffic, and G refers to the particular multicast group IP address for which S is the source.

In another example, when a router along a distribution tree becomes unavailable, multicast traffic has to be re-routed. The expected incoming interfaces will have to be updated as well to reflect the re-routing.

It has been proposed that the expected incoming interface information should be stored in special RPF tables where each entry corresponds to a multicast flow and each entry includes an expected incoming interface identifier. In such systems, when a network route change occurs, many entries of the RPF tables have to be reprogrammed with new interface information. Updating many entries of the RPF tables is time consuming. Given that network route changes occur frequently, delivery of multicast packets by those proposed mechanisms may be frequently interrupted.

An embodiment of the invention provides a solution to the problems of the prior art by storing two or more expected incoming interface identifiers for each multicast flow. One expected incoming interface identifier is flow-specific, and the other identifier is source-specific. For each multicast packet received, the network node either uses the flow-specific identifier or the source-specific identifier for RPF checks. When there is a change in network topology, the network node can quickly switch from one expected incoming interface identifier to the other without reprogramming the RPF tables with new interface information. In this way, a rapid network convergence to the new network topology can be accomplished, thereby reducing the risk of multicast routing loops and incorrect packet forwarding.

According to one embodiment of the invention, a Unicast Routing Table, an example of which is shown in FIG. 1, provides some of the expected incoming interface identifiers. The Unicast Routing Table, which is sometimes referred to as an "L3 lookup table," is typically used by a network node to forward IP traffic to the next hop. The search fields of a typical Unicast Routing Table include a "Source IP Address" and a "Dest. IP Address" (destination IP address). The result fields of a typical Unicast Routing Table can include next hop information and/or a pointer to another memory location that holds next hop information. In the table of FIG. 1, the next hop information includes a "Unicast Outgoing Interface Identifier" associated with each destination IP address. As is well known in the art, a unicast packet bearing a destination IP address (e.g., 10.1.1.1) will be forwarded to the Unicast Outgoing Interface that is associated with the destination IP address (e.g., Unicast Outgoing Interface A).

In the present embodiment, under certain conditions, (e.g., if the network node itself is a Rendezvous Point router (RP)), when a multicast packet is received on an interface, the network node interprets the source address in the multicast IP packet as the destination address for a unicast IP packet. The unicast destination IP address is looked up in the Unicast Routing Table to determine the corresponding unicast outgoing interface identifier. The network node then treats the unicast outgoing interface as the expected incoming interface for RPF purposes. That is, the network node compares the unicast outgoing interface identifier with an identifier of the actual incoming interface on which the multicast packet arrives. If there is a match, the multicast packet is received on a correct incoming interface, and the network node will forward the multicast packet. However, if the identifiers do not match, the network node will discard the multicast packet.

In one embodiment, the interface identifiers provided by the Unicast Routing Table are "source-specific" because the identifiers are stored and retrieved based on the multicast source IP address.

According to an embodiment of the invention, some of the expected incoming interface identifiers are stored within a Multicast Forwarding Information Table (FIT), an example of which is shown in FIG. 2. The Multicast FIT 20 is used by the network node to perform RPF checks under certain conditions. The search field of the table 20 includes a "Multicast Flow (S,G)" where (S,G) defines the multicast source IP address and the multicast group IP address. The result fields of the lookup table include expected incoming interface information and/or a pointer to a memory location that holds expected incoming interface information. In the present embodiment, each entry of the Multicast FIT 20 includes an expected incoming interface identifier. In addition, the result fields of the lookup table include a "RPF Flag," which will be discussed in greater detail below.

In one embodiment, the interface identifiers provided by the Multicast FIT are "flow-specific" because the identifiers are stored and retrieved based on the multicast flow.

In one embodiment, each RPF Flag stored in the Multicast FIT controls the selection of flow-specific or source-specific identifiers. In one embodiment, the RPF Flag is single-bit value indicative of where the identifier should be retrieved. If the RPF Flag is set, the network node will use an expected incoming interface identifier of the Multicast FIT 20 as the expected incoming interface identifier when performing the RPF check on a corresponding multicast flow. If the RPF Flag is not set, the network node will ignore the corresponding identifier of the Multicast FIT. Rather, the network node will look up the Unicast Forwarding Table and use a unicast outgoing interface identifier when performing the RPF check.

FIG. 3 is a block diagram illustrating a RPF engine 50 that performs Reverse Path Forwarding checks according to an embodiment of the invention. The RPF engine 50, which includes Interface Identifier Retrieval Logic 31, Interface Selection logic 32, and Compare Logic 33, can be can be implemented within in a network node, such as a router or switch. The Engine 50 can be implemented in hardware or as a software process running on a processor of the network node.

In operation, after receiving a multicast packet, Interface Identifier Retrieval Logic 31 examines the packet's header and retrieves two expected incoming interface identifiers—a source-specific one from the Unicast Routing Table 10 and a flow-specific one from the Multicast FIT 20 according to the header information. The Interface Identifier Retrieval Logic 31 also retrieves an RPF Flag according to the header information.

The Interface Selection Logic 32, depending on the value of the retrieved RPF flag, selects one of the two expected incoming interface identifiers for use in RPF checks. In one embodiment, when the RPF flag is set, the flow-specific identifier retrieved from the Multicast FIT 20 is selected. When the RPF flag is not set, the source-specific retrieved from the Unicast Routing Table 10 is selected.

The Compare Logic 33 then compares the selected identifier with the identifier of the packet's actual incoming interface. If the identifiers match, the multicast packet is deemed to have passed the RPF check and is provided to the forwarding engine of the network node. However, if the identifiers do not match, the multicast packet fails the RPF check and will be discarded.

In another embodiment, the RPF Engine 50 does not retrieve two expected incoming interface identifiers for each multicast packet. In this embodiment, the RPF Engine 50 first retrieves the RPF Flag when performing a RPF check, and then retrieves an interface identifier from either the Unicast Routing Table 10 or the Multicast FIT 20 according to the value of the RPF Flag.

In yet another embodiment, the RPF Flag is not stored within a Multicast FIT. Rather, the RPF Flag is stored in a Unicast Routing Table.

Figure 4:
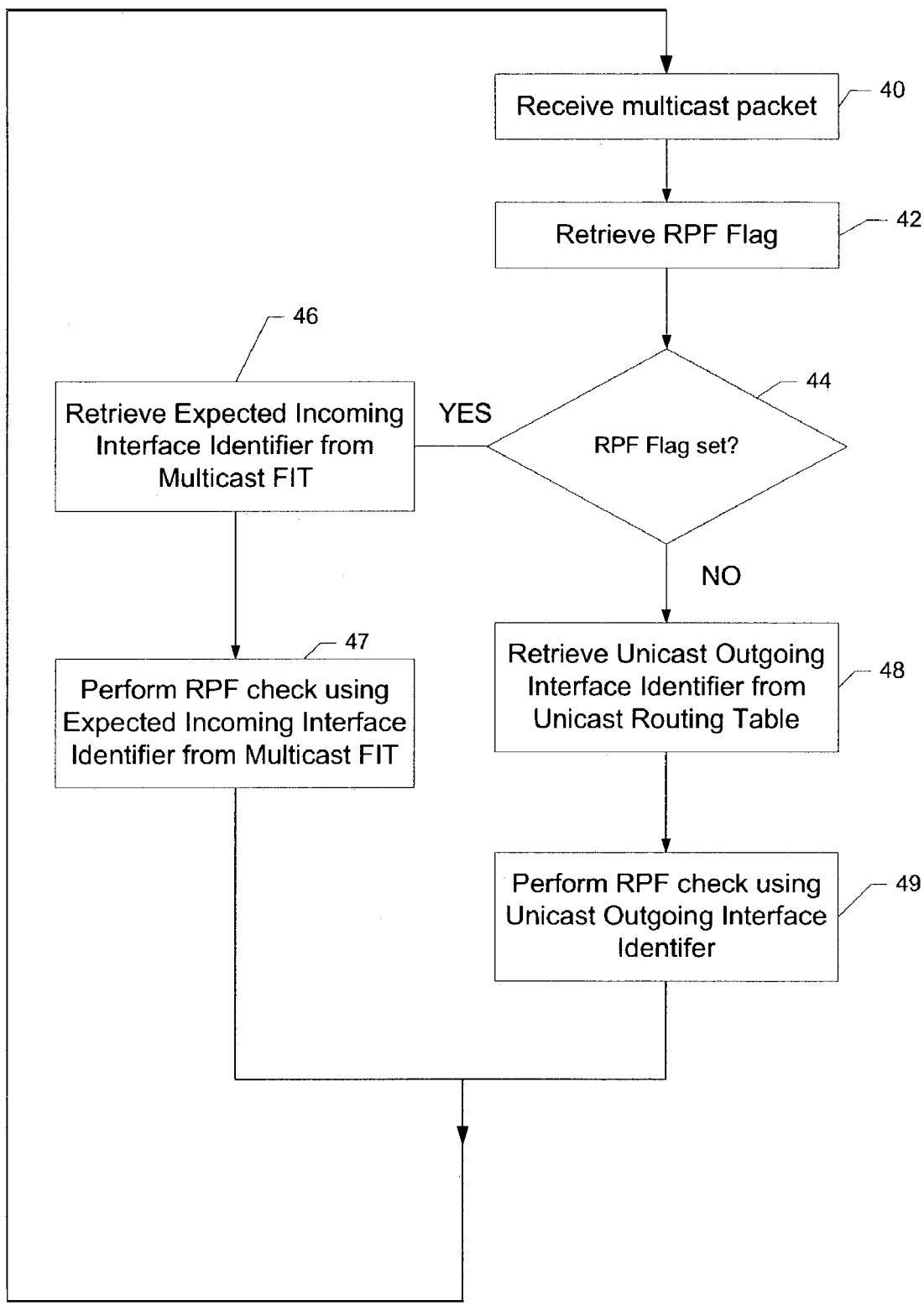
FIG. 4 is a flow diagram depicting some operations of the logic shown in FIG. 3 according to the invention.

FIG. 4 is a flow diagram depicting some operations of a RPF check mechanism that can be performed by the RPF engine 50 of FIG. 3 in accordance with an embodiment of the invention. As shown, at step 40, the RPF engine 50 receives a multicast packet. At step 42, the RPF engine 50 examines the packet header and looks up the Multicast FIT to retrieve a corresponding RPF Flag.

At decision point 44, the RPF engine 50 determines whether the RPF Flag is set. If so, at step 46, the RPF engine 50 retrieves an expected incoming interface identifier from the Multicast FIT. At step 47, the RPF engine 50 performs the RPF check using the retrieved expected incoming interface identifier. That is, the RPF engine 50 compares the retrieved expected incoming interface identifier to the identifier of the actual incoming interface, and discards the multicast packet if the identifiers do not match.

However, if the RPF Flag is not set, at step 48, the RPF engine 50 retrieves a unicast outgoing interface identifier corresponding to the packet's header information from the Unicast Routing Table. Then, at step 49, the RPF engine 50 performs a RPF check using the unicast outgoing interface identifier.

Attention now turns to some factors that may determine the value of the RPF Flag. In the following, a specific example is discussed in relation to Protocol Independent Multicast-Sparse Mode (PIM-SM). It should be noted that the invention is not limited to PIM-SM. Rather, the invention is applicable to protocols other than PIM-SM, and the factors discussed herein and other factors may be considered in PIM-SM and/or other multicasting protocols.

In PIM-SM, the expected incoming interface for a given multicast flow (S,G) may depend on factors such as:
  whether the router receiving the (S,G) packets is the Rendezvous Point Router (RP) associated with the multicast group G; and
  whether the router has already joined the Shortest Path Tree (SPT) for the (S,G) flow.

Table 1 below illustrates how the aforementioned factors affect the expected incoming interface when performing the RPF check for a packet that is part of an (S,G) flow.

TABLE 1

| Is this router the RP for Group G? | (S,G) flow Already switched to the SPT? | Expected incoming interface for (S,G) packets |
|---|---|---|
| No | No | Via the interface leading to the RP corresponding to multicast group G. |
| No | Yes | Via the interface leading to the subnet where the sender 'S' is located. |
| Yes | No | Via the PIM tunnel/register interface. |
| Yes | Yes | Via the interface leading to the subnet where the sender 'S' is located. |

As illustrated in Table 1, for PIM-SM, the expected incoming interface for every multicast packet can be the interface leading to the RP corresponding to the packet's multicast group. The expected incoming interface can also be the interface leading directly to the subnet where the multicast source is located. In addition, if the network node under consideration is the RP for the packet's multicast group, then the expected incoming interface can be the PIM tunnel/register interface.

Suppose a multicast flow (S2, G2) is received by a network node that is not a RP for the multicast group G2. Also suppose the multicast flow (S2,G2) has not switched to the Shortest Path Tree (SPT). In this case, the Multicast FIT entry corresponding to the flow (S2,G2) is programmed to contain the identifier of the interface leading to the RP of the multicast group G2. The Unicast Routing Table entry corresponding to the source S2 is programmed to contain the identifier of the interface leading to the subnet where S2 is located.

When the multicast group flow is in RPT mode, the corresponding RPF Flag is programmed to be '1' such that the flow-specific identifier of the Multicast FIT is used in RPF checks.

Now suppose the multicast flow (S2,G2) switches to the SPT from the Rendezvous Point Tree (RPT). When this occurs, the RPF Flag is updated to be a '0'. Then, when a RPF check is performed, the identifier of the interface leading to S2 is located will be used. In one embodiment, the search fields are stored within a Content Addressable Memory (CAM), and the expected incoming interface information and the RPF Flag are stored in an off-chip Random Access Memory (RAM).

Now suppose the interface leading to S2 is no longer available. In this situation, the Unicast Routing Table entries will be updated with new interface information through IP routing protocols. Note that no update to the Multicast FIT is necessary. The correct expected interface identifiers will be used for RPF checks once the Unicast Routing Table is updated.

Figure 5:
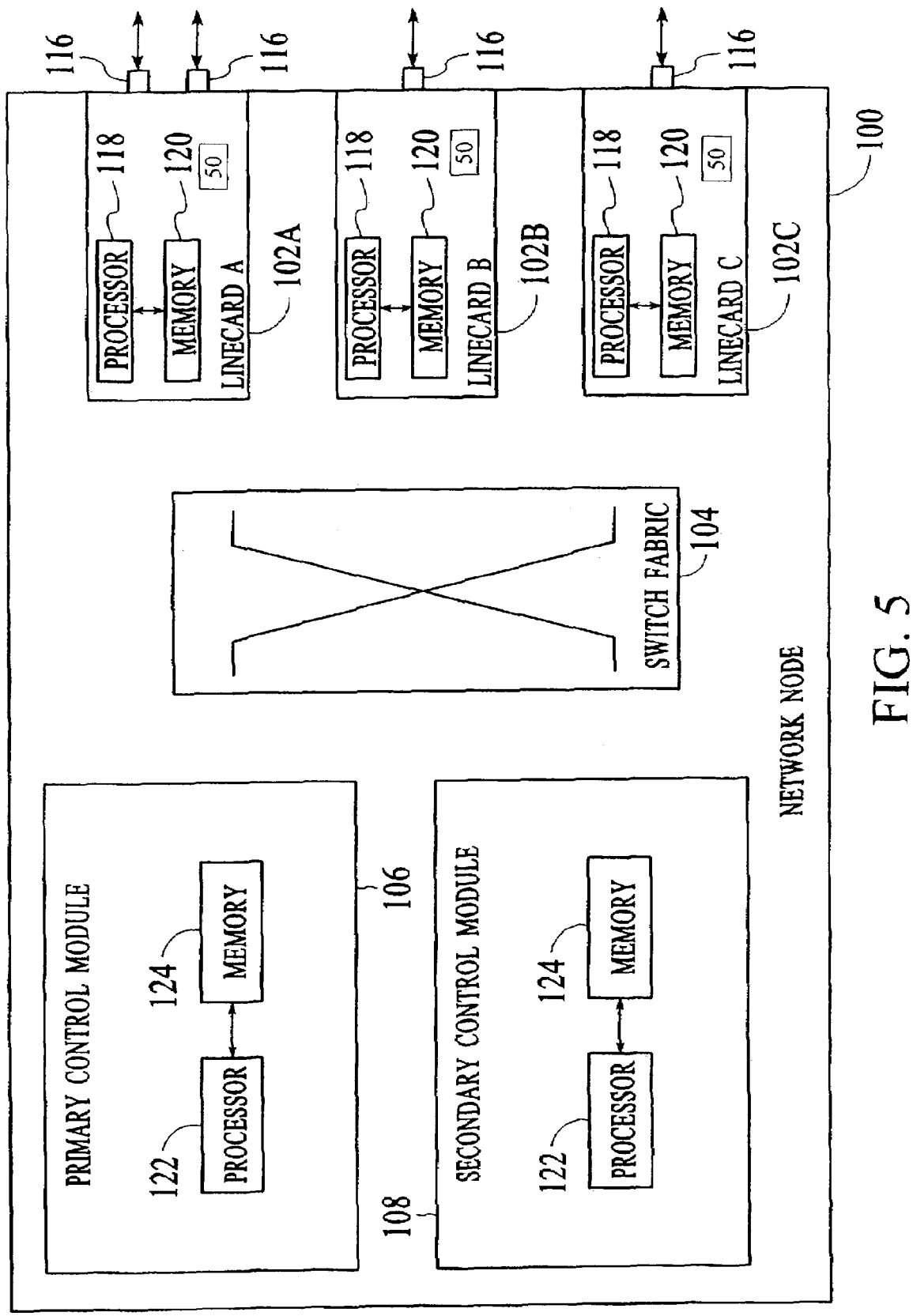
FIG. 5 depicts details of a network node in which an embodiment the invention can be implemented.

FIG. 5 illustrates details of a network node 100 in which an embodiment of the invention can be implemented. The network node 100 includes a primary control module 106, a secondary control module 108, a switch fabric 104, and three line cards 102A, 102B, and 102C (line cards A, B, and C). The switch fabric 104 provides datapaths between input ports and output ports of the network node 100 and may include, for example, shared memory, shared bus, and crosspoint matrices.

The primary and secondary control modules 106 and 108 support various switch/router and control functions, such as network management functions and protocol implementation functions. The control modules 106 and 108 each include a processor 122 and memory 124 for carrying out the various functions. The processor 122 may include a multi-function microprocessor (e.g., an Intel i386 processor) and/or an application specific processor that is operationally connected to the memory. The memory 124 may include electrically erasable programmable read-only memory (EEPROM) or flash ROM for storing operational code and dynamic random access memory (DRAM) for buffering traffic and storing data structures, such as forwarding information.

The line cards 102A, 102B, and 102C each include at least one port 116, a processor 118, and memory 120. The processor 118 may be a multifunction processor and/or an application specific processor that is operationally connected to the memory 120, which can include a RAM or a Content Addressable Memory (CAM). Each of the processors 118 performs and supports various switch/router functions. Each line card also includes a RPF Engine 50. The RPF Engine 50 decides whether a multicast packet received through port 116 is to be dropped or forwarded to an output port.

Although specific embodiments of the invention have been described and illustrated, the invention is not to be limited to the specific forms or arrangements of parts as described and illustrated herein. For instance, it should also be understood that throughout this disclosure, where a software process or method is shown or described, the steps of the method may be performed in any order or simultaneously, unless it is clear from the context that one step depends on another being performed first. The invention is limited only by the claims.

What is claimed is:

1. A method for performing a Reverse Path Forwarding (RPF) check, comprising:
   receiving a multicast packet via an interface of a network node;
   retrieving a RPF flag value corresponding to the multicast packet, the RPF flag value to control a selection of an expected incoming interface identifier for the multicast packet;
   obtaining the expected incoming interface identifier for the multicast packet from a selected location of a plurality of locations from either a unicast routing table or a multicast forwarding information table, the selected location depending on the RPF flag value; and
   comparing the expected incoming interface identifier with an identifier for the interface.

2. The method of claim 1, further comprising dropping the multicast packet if the expected incoming interface identifier does not match the identifier for the interface.

3. The method of claim 1, further comprising forwarding the multicast packet if the expected incoming interface identifier matches the identifier for the interface.

4. The method of claim 1, wherein the obtaining step comprises:
   performing a lookup on the multicast forwarding information table using multicast flow information of the multicast packet to retrieve a RPF flag value and a first expected incoming interface identifier;
   performing a lookup on the unicast routing table using the source address to retrieve a second expected incoming interface identifier; and
   selecting one of the first expected incoming interface identifier and the second expected incoming interface identifier to be the expected incoming interface identifier according to the RPF flag value.

5. The method of claim 4, wherein the RPF flag value is representative of a state of a multicast flow that includes the multicast packet.

6. The method of claim 1, wherein the multicast forwarding information table comprises a plurality of entries each including a search field and a result field, wherein the search field comprises a multicast flow identifier, and wherein the result field comprises the RPF flag value.

7. The method of claim 1, wherein retrieving the RPF flag value comprises retrieving an RPF flag from the multicast forwarding information table.

8. The method of claim 1, wherein retrieving the RPF flag value comprises retrieving an RPF flag from the unicast routing table.

9. The method of claim 1, further comprising:
   determining an interface leading to a source address of the multicast packet is unavailable;
   updating an entry of the unicast routing table with new interface information, the entry corresponding to the source address of the multicast packet; and
   using the entry of the unicast routing table to obtain the expected incoming interface identifier for the multicast packet, without updating the multicast forwarding information table.

10. A network node capable of multicasting, comprising:
    means for receiving a multicast packet via an interface of a network node;
    means for retrieving a RPF flag value corresponding to the multicast packet, the RPF flag value to control a selection of an expected incoming interface identifier for the multicast packet;
    means for obtaining the expected incoming interface identifier for the multicast packet from a selected location of a plurality of locations from either a unicast routing table or a multicast forwarding information table, the selected location depending or the RPF flag value; and
    means for comparing the expected incoming interface identifier with an identifier for the interface.

11. The network node of claim 10, further comprising means for dropping the multicast packet if the expected incoming interface identifier does not match the identifier for the interface.

12. The network node of claim 10, further comprising means for forwarding the multicast packet if the expected incoming interface identifier matches the identifier for the interface.

13. The network node of claim 10, wherein the obtaining means comprises:
    means for performing a lookup on the multicast forwarding information table using multicast flow information of the multicast packet to retrieve a RPF flag value and a first expected incoming interface identifier;
    means for performing a lookup on the unicast routing table using the source address to retrieve a second expected incoming interface identifier; and
    means for selecting one of the first expected incoming interface identifier and the second expected incoming interface identifier to be the expected incoming interface identifier according to the RPF flag value.

14. The network node of claim 13, wherein the RPF flag value is representative of a state of a multicast flow tat includes the multicast packet.

15. The network node of claim 10, wherein the multicast forwarding information table comprises a plurality of entries each including a search field and a result field, wherein the search field comprises a multicast flow identifier, and wherein the result field comprises the RPF flag value.

16. The network node of claim 10, wherein the retrieving means comprise means for retrieving an RPF flag from the multicast forwarding information table.

17. The network node of claim 10, wherein the retrieving means comprise means for retrieving an RPF flag from the unicast routing table.

18. The network node of claim 10, further comprising:
    means for determining an interface leading to a source address of the multicast packet is unavailable;
    means for updating an entry of the unicast routing table with new interface information, the entry corresponding to the source address of the multicast packet; and
    means for using the entry of the unicast routing table to obtain the expected incoming interface identifier for the multicast packet, without updating the multicast forwarding information table.

19. A network node capable of multicasting, comprising:
a plurality of interfaces;
a first circuit coupled to the interfaces and configured to receive a stream of multicast packets, wherein the first circuit, upon receiving a multicast packet via a first one of the interfaces, retrieves a RPF flag value corresponding to the multicast packet, the RPF flag value to control a selection of an expected incoming interface identifier for the multicast packet, and obtains the expected incoming interface identifier for the multicast packet from a selected location of a plurality of locations from either a unicast routing table or a multicast forwarding information table according to at least in part a state of the stream of multicast packets, the selected location depending on the RPF flag value; and
a second circuit coupled to the first circuit and configured to compare the expected incoming interface identifier with an identifier for the first interface.

20. The network node of claim 19, wherein the second circuit drops the multicast packet if the expected incoming interface identifier does not match the identifier for the interface.

21. The network node of claim 19, wherein the second circuit forwards the multicast packet if the expected incoming interface identifier matches the identifier for the interface.

22. The network node of claim 19, wherein first circuit performs a lookup on the multicast forwarding information table using multicast flow information of the multicast packet to retrieve a RPF flag value and a first expected incoming interface identifier, performs a lookup on the unicast routing table using the source address to retrieve a second expected incoming interface identifier, and selects one of the first expected incoming interface identifier and the second expected incoming interface identifier to be the expected incoming interface identifier according to the RPF flag value.

23. The network node of claim 22, wherein the RPF flag value is representative of a state of the stream of multicast packets.

24. The network node of claim 19, wherein the multicast forwarding information table comprises a plurality of entries each including a search field and a result field, wherein the search field comprises a multicast flow identifier, and wherein the result field comprises the RPF flag value.

25. The network node of claim 19, wherein the first circuit comprises retrieval logic configured to retrieve an RPF flag from the multicast forwarding information table.

26. The network node of claim 19, wherein the first circuit comprises retrieval logic configured to retrieve an RPF flag from the unicast routing table.

27. The network node of claim 19, further comprising an RPF engine configured to program a RPF flag with the RPF flag value according to a plurality of factors, the plurality of factors comprising a first factor based on whether the network node is a rendezvous point router associated with a multicast group and a second factor based on whether the router is joined with a shortest path tree for the stream of multicast packets.

* * * * *